United States Patent
Meuninck et al.

(10) Patent No.: US 8,812,986 B2
(45) Date of Patent: Aug. 19, 2014

(54) MULTIMEDIA CONTENT INFORMATION DISPLAY METHODS AND DEVICE

(75) Inventors: Troy C. Meuninck, Newnan, GA (US); Scott Morris, Decatur, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1160 days.

(21) Appl. No.: 12/126,690

(22) Filed: May 23, 2008

(65) Prior Publication Data

US 2009/0293014 A1    Nov. 26, 2009

(51) Int. Cl.
*G06F 3/048*     (2013.01)
*G06F 3/0481*    (2013.01)

(52) U.S. Cl.
CPC .................. *G06F 3/04812* (2013.01)
USPC .......................... 715/834; 715/835

(58) Field of Classification Search
CPC .................................. G06F 3/04812
USPC .......................... 715/834, 810, 779
See application file for complete search history.

(56) References Cited

U.S. PATENT DOCUMENTS

| | | | |
|---|---|---|---|
| 5,544,354 A * | 8/1996 | May et al. ........................ | 1/1 |
| 6,452,611 B1 * | 9/2002 | Gerba et al. ................... | 715/721 |
| 6,515,656 B1 * | 2/2003 | Wittenburg et al. .......... | 345/418 |
| 6,636,246 B1 * | 10/2003 | Gallo et al. ................... | 715/805 |
| 7,013,435 B2 * | 3/2006 | Gallo et al. ................... | 715/850 |
| 7,136,870 B1 * | 11/2006 | McGloughlin ................ | 1/1 |
| 7,305,692 B2 | 12/2007 | Blackketter et al. | |
| 7,546,551 B2 * | 6/2009 | Sakata et al. .................. | 715/841 |
| 7,548,915 B2 * | 6/2009 | Ramer et al. ................. | 705/14.54 |
| 7,603,628 B2 * | 10/2009 | Park et al. ..................... | 715/764 |
| 7,685,530 B2 * | 3/2010 | Sherrard et al. .............. | 715/764 |
| 7,710,396 B2 * | 5/2010 | Smith et al. ................... | 345/157 |
| 7,769,745 B2 * | 8/2010 | Naaman et al. ............... | 707/713 |
| 8,001,476 B2 * | 8/2011 | Gallo ............................ | 715/742 |
| 8,196,042 B2 * | 6/2012 | Hinckley et al. ............. | 715/711 |
| 8,300,055 B2 * | 10/2012 | Niles et al. .................... | 345/473 |
| 8,418,075 B2 * | 4/2013 | Gallo et al. ................... | 715/767 |
| 2001/0028369 A1 * | 10/2001 | Gallo et al. ................... | 345/848 |
| 2002/0042923 A1 * | 4/2002 | Asmussen et al. ............ | 725/92 |
| 2002/0194591 A1 * | 12/2002 | Gargi ............................ | 725/32 |

(Continued)

FOREIGN PATENT DOCUMENTS

WO    WO 2006/119269 A2    11/2006

OTHER PUBLICATIONS

US 7,882,524, 02/2011, Jerding et al. (withdrawn)*

*Primary Examiner* — William Titcomb
(74) *Attorney, Agent, or Firm* — Guntin & Gust, PLC; Joseph P. Hrutka

(57) ABSTRACT

A method of displaying available multimedia content items includes receiving a request to display a set of available content items. In response to the request, a first set of icons are provided for display, where each icon corresponds to a type of available multimedia content. The icons are displayed in an approximately circular arrangement, providing for easy viewing and manipulation. In response to selection of an icon, a second set of icons is displayed in an approximately circular arrangement, where each icon of the second set corresponds to a sub-type of the available multimedia content. The user can continue to select icons based on the type of desired multimedia content until a list of available multimedia content items are displayed. Accordingly, the user is able to quickly locate and view multimedia content of a desired type, resulting in an improved user experience.

18 Claims, 6 Drawing Sheets

(56) References Cited

U.S. PATENT DOCUMENTS

| | | | |
|---|---|---|---|
| 2003/0046437 A1* | 3/2003 | Eytchison et al. | 709/250 |
| 2004/0210850 A1* | 10/2004 | Bermudez et al. | 715/848 |
| 2004/0230636 A1* | 11/2004 | Masuoka et al. | 708/800 |
| 2005/0187943 A1* | 8/2005 | Finke-Anlauff et al. | 707/100 |
| 2005/0196136 A1 | 9/2005 | Blackketter et al. | |
| 2006/0026647 A1 | 2/2006 | Potrebic et al. | |
| 2006/0066755 A1 | 3/2006 | Kowald et al. | |
| 2006/0095865 A1* | 5/2006 | Rostom | 715/810 |
| 2006/0130102 A1 | 6/2006 | Matero et al. | |
| 2006/0136980 A1 | 6/2006 | Fulcher et al. | |
| 2006/0150218 A1 | 7/2006 | Lazar et al. | |
| 2006/0156228 A1* | 7/2006 | Gallo et al. | 715/523 |
| 2006/0161863 A1* | 7/2006 | Gallo | 715/810 |
| 2007/0130543 A1* | 6/2007 | Lee et al. | 715/810 |
| 2007/0136761 A1* | 6/2007 | Basmajian et al. | 725/62 |
| 2007/0271528 A1* | 11/2007 | Park et al. | 715/810 |
| 2007/0271530 A1* | 11/2007 | Klos et al. | 715/825 |
| 2007/0288868 A1* | 12/2007 | Rhee et al. | 715/840 |
| 2008/0307350 A1* | 12/2008 | Sabatelli et al. | 715/779 |
| 2008/0319818 A1* | 12/2008 | Gurdin et al. | 705/8 |
| 2009/0064029 A1* | 3/2009 | Corkran et al. | 715/781 |
| 2009/0177644 A1* | 7/2009 | Martinez et al. | 707/5 |
| 2009/0189917 A1* | 7/2009 | Benko et al. | 345/647 |
| 2010/0079414 A1* | 4/2010 | Ferlitsch | 345/179 |
| 2011/0010658 A1* | 1/2011 | Nash et al. | 715/784 |
| 2011/0055696 A1* | 3/2011 | Dollar et al. | 715/702 |
| 2011/0173554 A1* | 7/2011 | Niles et al. | 715/769 |
| 2011/0202874 A1* | 8/2011 | Ramer et al. | 715/810 |
| 2012/0174038 A1* | 7/2012 | Tamayo et al. | 715/849 |
| 2012/0324401 A1* | 12/2012 | Morris | 715/836 |
| 2013/0055097 A1* | 2/2013 | Soroca et al. | 715/738 |

* cited by examiner

MULTIMEDIA CONTENT INFORMATION DISPLAY METHODS AND DEVICE

FIELD OF THE DISCLOSURE

The present disclosure generally relates to multimedia content and more particularly relates to displays of available multimedia content items.

BACKGROUND

The amount of multimedia content available to viewers continues to increase. Content has become available from more sources, many of which have expanded the amount of content available for viewing. While this presents the viewer with flexibility in her viewing choices, the number of available content items can make it difficult for the viewer to locate a desired item. Electronic guides have been developed to present the viewer with a list of available content items, but these guides can be difficult to navigate efficiently, resulting in a poor user experience.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods, records, or computer-readable media. Moreover, some statements may apply to some innovative features but not to others.

A method of displaying available multimedia content items includes receiving a request to display a set of available content items. In response to the request, a first set of icons are provided for display, where each icon corresponds to a type of available multimedia content. The icons are displayed in an approximately circular arrangement, providing for easy viewing and manipulation. In response to selection of an icon, a second set of icons is displayed in an approximately circular arrangement, where each icon of the second set corresponds to a sub-type of the available multimedia content. The user can continue to select icons based on the type of desired multimedia content until a list of available multimedia content items are displayed. Accordingly, the user is able to quickly locate and view multimedia content of a desired type, resulting in an improved user experience.

Figure 1:
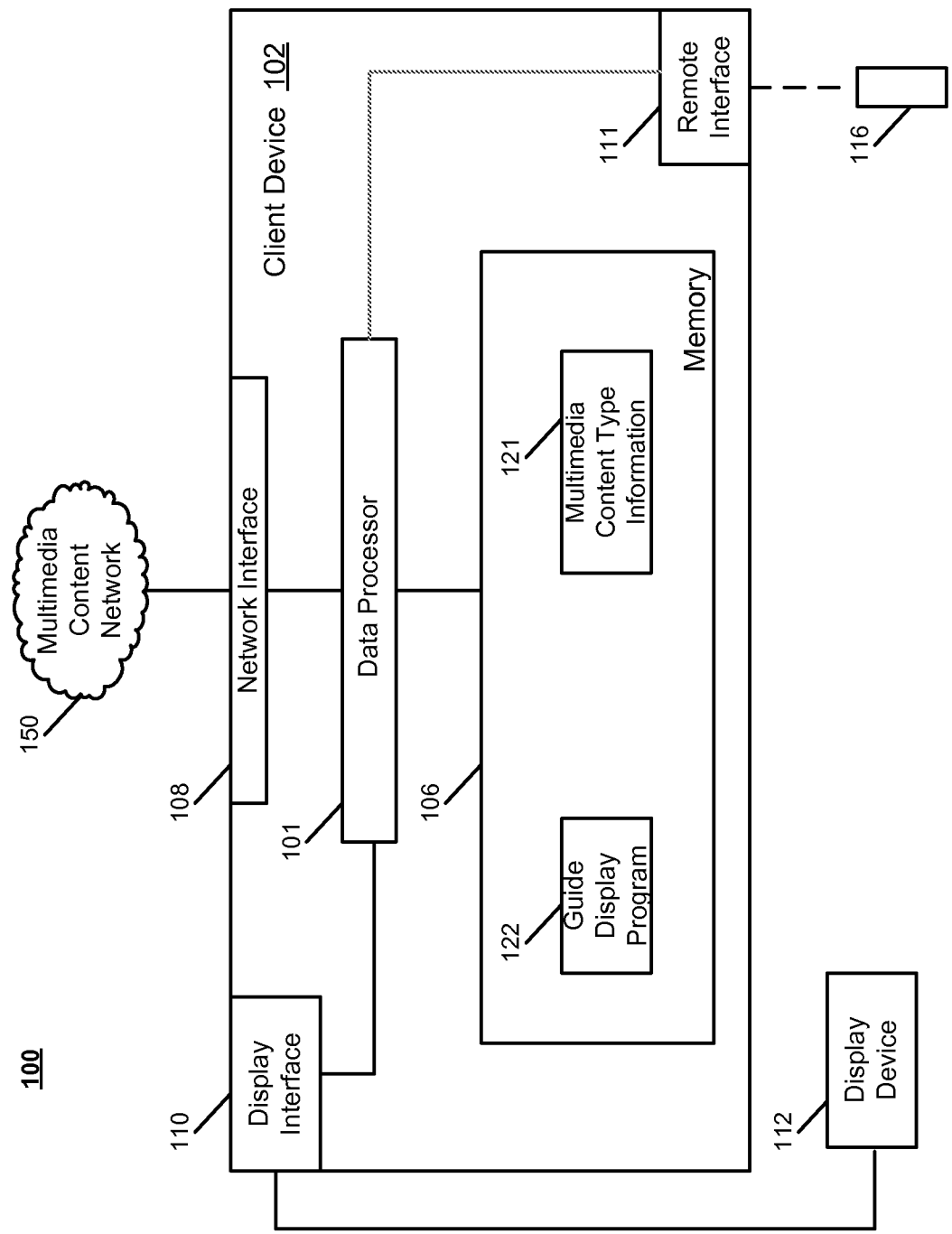
FIG. 1 is a block diagram of a multimedia display system in accordance with one embodiment of the present disclosure.

FIG. 1 illustrates a block diagram of a particular embodiment of a multimedia display system 100 including a multimedia network 150, a client device 102, a display device 112, and a remote control 116. The client device 102 includes a network interface 108 connected to the multimedia network 150, and a display interface 110 connected to the display device 112. In addition, the client device 102 includes a data processor 101, a memory 106, and a remote interface 111. The memory 106, network interface 108, display interface 110, and remote interface 111 are each connected to the data processor 101.

The multimedia network 150 is a network configured to provide multimedia content. As used herein, multimedia content refers to any type of multimedia information that can be provided to a user, including audio content, video content, image content, or the like, or any combination thereof. A multimedia content item refers to a particular unit of multimedia content that can be accessed by the user. For example, a multimedia content item can be a video content item, such as a television program, movie, video clip, or the like, an audio content item, such as a song, album, or the like, a web page, a picture, a photograph, or the like, or any combination thereof. The multimedia network 150 retrieves multimedia content items from content sources (not shown) and provides the items to multimedia devices such as the client device 102. In an embodiment, the multimedia network 150 is a broadcast network configured to broadcast multiple channels of multimedia content to multiple devices according to a program schedule. In another embodiment, the multimedia network 150 is a network configured to provide designated multimedia content items to specific multimedia devices in response to user requests. In still another embodiment, the multimedia network 150 can provide both broadcast multimedia content and provide requested multimedia content items to specific client devices. The multimedia network 150 can be a satellite network, a cable network, an Internet Protocol Television (IPTV) network, a wide area network such as the Internet, or any combination thereof.

In the illustrated embodiment of FIG. 1, the multimedia content items provided by the multimedia network 150 are associated with a number of multimedia content categories. As used herein, multimedia content category refers to a characteristic of a multimedia content item, such as subject matter, that differentiates the content item from other content items. Examples of multimedia content types can include sports, movies, reality television, and the like. In addition, each multimedia content category can be associated with different sub-categories of multimedia content. For example, a sports multimedia content type can be associated with sub-categories such as baseball, football, basketball, or the like. As used herein, categories and sub-categories of multimedia content are referred to as multimedia content types. Further, a sub-category of a particular multimedia content type is referred to herein as a sub-type of the multimedia content type. It will be appreciated that a particular multimedia content item can be associated with more than one content type or sub-type. For example, a baseball movie can be associated both with a sports type and with a movie type. In the illustrated embodiment of FIG. 1, the multimedia network 150 is configured to communicate metadata or other information indicating the types and sub-types of multimedia content items provided by the network. In other embodiments, the metadata or other information can be provided by a separate network.

The display device 112 is a multimedia display device that can display multimedia content. As used herein, "display" refers to any type of multimedia presentation to the user, including visual or audio presentation. Thus, the display device can be a video display device, such as a monitor, television, projection display or the like, an audio display device, such as audio speakers or the like, or any combination thereof. The display device 112 is configured to receive rendered multimedia information from the client device 102 and display the multimedia information to be visible to the user. In an embodiment, the display device 112 can include a touch-screen or other input device to allow the user to provide input information in response to displayed information. The display device 112 can be configured to communicate the input information to the client device 102.

The remote control 116 is configured to include a number of buttons or other input devices (not shown) to allow the user to provide input information for the multimedia display system 100. The remote control 116 is further configured to communicate the input information to the client device 102. The information can be communicated in a wired or wireless fashion. In an embodiment, the remote control 116 can be a gesture-enabled input device, whereby the user can provide input information via gesturing or other physical movement of the remote control 116. In other embodiments, the remote control 116 can include a touch-screen or other input device to allow the user to enter input information in response to information displayed at the display device 112. In addition, the remote control 116 can be any device that can provide remote control functionality, such as a cell phone, personal data assistant, or other device. In another embodiment, the remote control 116 can be a computer device, such as a laptop, personal computer, or handheld device, that controls the client device 102 remotely via a network. In an embodiment, the remote control 116 can provide a web interface to allow the user to provide input information to the client device 102.

The client device 102 is a device configured to receive multimedia information and render that information for display. The client device 102 is further configured to provide an interface for the user to identify and request desired multimedia content from the multimedia network 150. The client device 102 can be a set-top box, computer, television, or the like.

The network interface 108 of the client device 102 is configured to receive multimedia content items from the multimedia network 150. In an embodiment, the network interface 108 can process incoming multimedia content items to place the items in an appropriate format for manipulation by the data processor 101. The network interface 108 can also communicate requests for designated multimedia content items to the multimedia network 150.

The memory 106 is a computer readable medium such as volatile memory (e.g. random access memory) or non-volatile memory (e.g. flash memory or a hard disk drive). The memory 106 is configured to store information for the client device 102. In the illustrated embodiment, the memory 106 stores a guide display program 122 and multimedia content type information 121. The guide display program 122 is a set of instructions to manipulate the data processor 101 to display information related to available multimedia content items, as described further herein. The multimedia content type information 121 includes information about characteristics of available multimedia content items, including type and sub-type information for each item. In an embodiment, the multimedia content type information 121 is based on information provided by the multimedia network 150.

The remote interface 111 is configured to receive input information based on the user's interactions with the remote control 116. In the illustrated embodiment of FIG. 1, the remote interface 111 provides a physical communication layer to convert wireless communications from the remote control 116 to a format that can be processed by the data processor 101.

The display interface 110 is configured to receive multimedia content information from the data processor 101, and is configured to render the received multimedia content information in an appropriate format for display at the display device 112. The multimedia content information can include multimedia content items and can include other information for display, such as status information for the client device 102, time information, and other non-content-item information. In an embodiment, the display interface can render multimedia content items and non-content item information for display in a combined format, such as an overlay format, picture-in-picture, and the like. The display interface 110 communicates rendered multimedia information to the display device 112 for display.

In operation, the user can request, via manipulation of the remote control 116, a particular multimedia content for display at the display device 112. In response, the processor 101 is configured to determine the requested content and provide the content to the display interface 110 for rendering. In an embodiment, the data processor 101 can request the multimedia information from the multimedia network 150 in response to the user's request. The multimedia network 150 provides the requested multimedia information, and the data processor 101 communicates the information to the display device 110 for rendering.

In addition, the user can interact with the remote control 116 to request that the client device 102 display a guide indicating what multimedia content items are available. As used herein, a multimedia content item is available if it can be provided for display or storage at the time the guide is requested or if it is designated to be a candidate for provision at a future time. Accordingly, a multimedia content item can be available even if it cannot immediately be provided for display or recording. For purposes of discussion, the user's request to display the set of available multimedia content items is referred to herein as a guide request.

In response to the guide request, the set-top box 102 invokes the guide display program 122, which manipulates the data processor 101 to access the multimedia content type information 121. Based on the multimedia content type information 121, the data processor 101 identifies a set of icons, where each icon in the set is associated with a different type of available multimedia content item. The identified set of icons can also be based on other configuration information, such as user-defined or programmed information. For example, the user can program a set of preferences to identify which icons, or which multimedia types, should be identified for display.

The data processor 101 communicates the set of icons to the display device 112 via the display interface 110 so that the icons are displayed in an approximately circular arrangement. As used herein, an approximately circular arrangement refers to an arrangement of icons or other indicators where each indicator is placed at a point along a circle, ellipse, oval, or portion thereof. Thus, an approximately circular arrangement can include arrangement along a full circle, an ellipse, a half-circle, an arc, or the like. In other embodiments, the icons can be arranged so that the icons form points of an enclosed shape such as a circle, ellipse, or a polygon, such as a triangle, hexagon, square, or the like.

Figure 2:
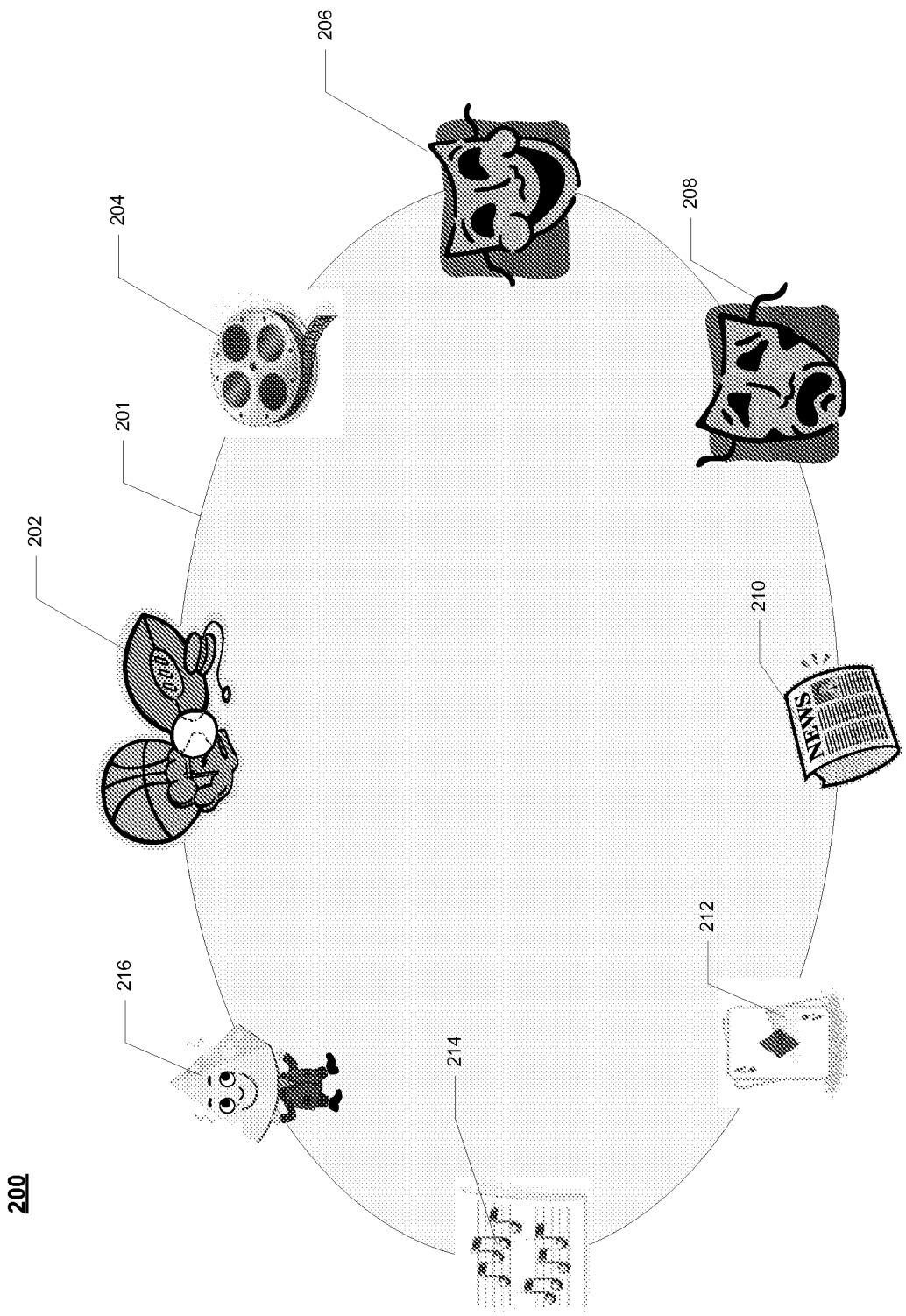
FIG. 2 is a diagram illustrating a display format for available multimedia content items in accordance with one embodiment of the present disclosure.

FIG. 2 shows a particular embodiment of a display 200 indicating available multimedia content types. The display format 200 includes icons 202, 204, 206, 208, 210, 212, 214, and 216 (icons 202-216). As illustrated, the icons 202-216 are arranged in an approximately circular arrangement along an ellipse 201. It will be appreciated that although the ellipse 201 is shown as a displayed shape in FIG. 2, in other embodiments the shape is not displayed but instead is implied by the arrangement of the icons 202-216.

In the illustrated embodiment of FIG. 2, each of the icons 202-216 is associated with a type of available multimedia content item. Further, each of the icons 202-216 is configured to give a visual indication of the associated multimedia content type. For example, icon 202 is associated with multimedia content items related to sports, icon 204 is related to multimedia content items representing movies, and icon 208 is associated with multimedia content items representing television drama programs. The icons 202-216 can provide further visual cues to indicate information about their associated multimedia content items. For example, the size of each of the icons 202-216 can indicate an amount or number of multimedia content items available for the associated type. Thus, a larger icon can indicate that more multimedia content items of the associated type are available and a smaller icon can indicate that fewer multimedia content items are available. Thus, icon 202 can be displayed in a larger size than icon 208 to indicate that there are more sports items available than television drama programs.

In other embodiment, the size of a displayed icon can indicate a relative popularity of the type of multimedia content associated with the icon. The popularity can be associated with the viewing habits of a particular individual, family, group, subscriber base, or other population. Thus, the icon 204 can be displayed in a larger size than the icon 202 to indicate that movies are more popular than sports programs for a particular population.

Referring again to FIG. 1, the user can manipulate the remote control 116 to provide input information based on the display 200. In particular, the user can provide input information to select a particular one of the icons for focus. In an embodiment, the data processor 101 indicates which icon has been selected for focus by changing a visual characteristic of the focused icon, such as its color, size, luminosity, or the like. The data processor 101 can also indicate that an icon has been selected for focus by displaying an animation or other visual cue, such as animating the icon itself. In addition, the data processor 101 can indicate an icon focus by changing the position of the icons 202-216. For example, in the illustrated embodiment of FIG. 2, the focused icon can be specified as the icon at the top of the arranged icons (i.e. at the position occupied by icon 202 in illustrated FIG. 2). In response to the user's request to change which is the focused icon, the data processor 101 can cause the icons 202-216 to be rotated about the ellipse 201 so that a different icon is placed at the top. In an embodiment, the rotation can be visually displayed as an animated movement of the icons 202-216.

The user can request further information about available multimedia content items for a particular type or sub-type by selecting, via interactions with the remote control 116, a particular icon of the icons 202-216 for focus, and then providing input information requesting additional options or other information. For example, the user can focus a particular icon, then select a remote button (e.g. an "Enter" button) to request additional options for the multimedia content type associated with the focused icon.

Figure 3:
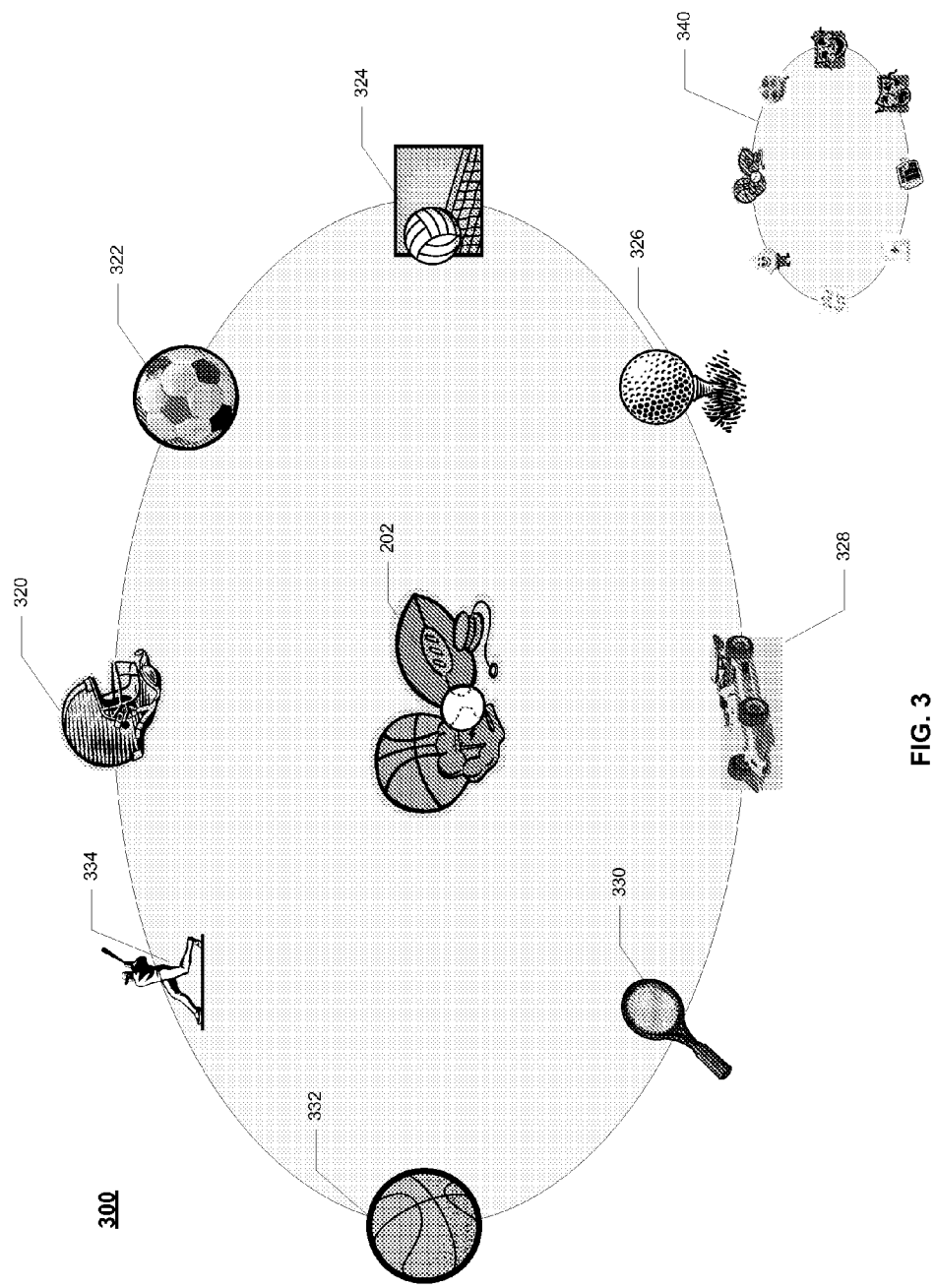
FIG. 3 is a diagram illustrating an alternative display format for available multimedia content items in accordance with one embodiment of the present disclosure.

In response, the data processor 101 determines a set of sub-types associated with the selected multimedia content type and displays a second set of icons to indicate each of the set of sub-types. FIG. 3 shows an example display 300 for icons associated with sub-types. In particular, display 300 shows icons 320, 322, 324, 326, 328, 330, 332, and 334 (icons 320-334), each associated with a sub-type of sports program. Display 300 is initiated by the user selecting icon 202, which is associated with a sports program multimedia content type. Accordingly, each of the icons 320-334 is associated with a sub-type of sports program, as indicated by the visual appearance of each icon. For example, icon 334 is associated with baseball multimedia content items (e.g. televised baseball games) and icon 330 is associated with tennis multimedia content items.

The display 300 also includes a smaller visual representation 340 of the display 200 of FIG. 2. In response to selection of the icon 202, the processor 101 can cause the display 200 to be visually rendered as representation 340. In an embodiment, the processor 101 can provide a visual representation of the change from display 200 to display 300 by initiating an animation so that the display 200 appears to shrink in size until it is rendered as representation 340. Further, via interaction with the remote control 116, the user can provide input information indicating a desire to return to display 200. Accordingly, the processor 101 can cause display 200 to be re-displayed at the display device 112. Thus, the user can traverse back to display 200 in order to select another type of multimedia content.

Figure 4:
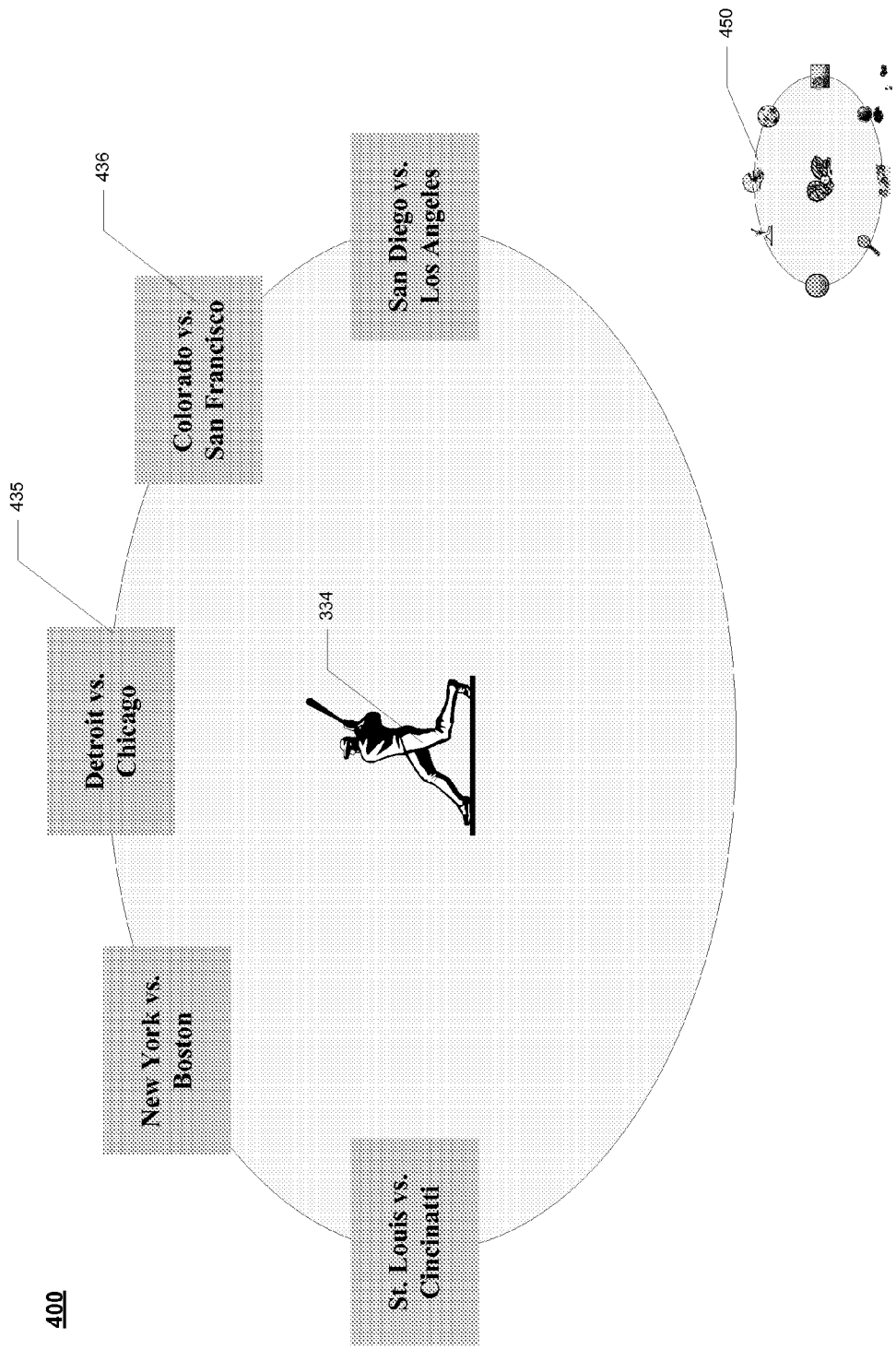
FIG. 4 is a diagram illustrating another display format for available multimedia content items in accordance with one embodiment of the present disclosure.
Figure 5:
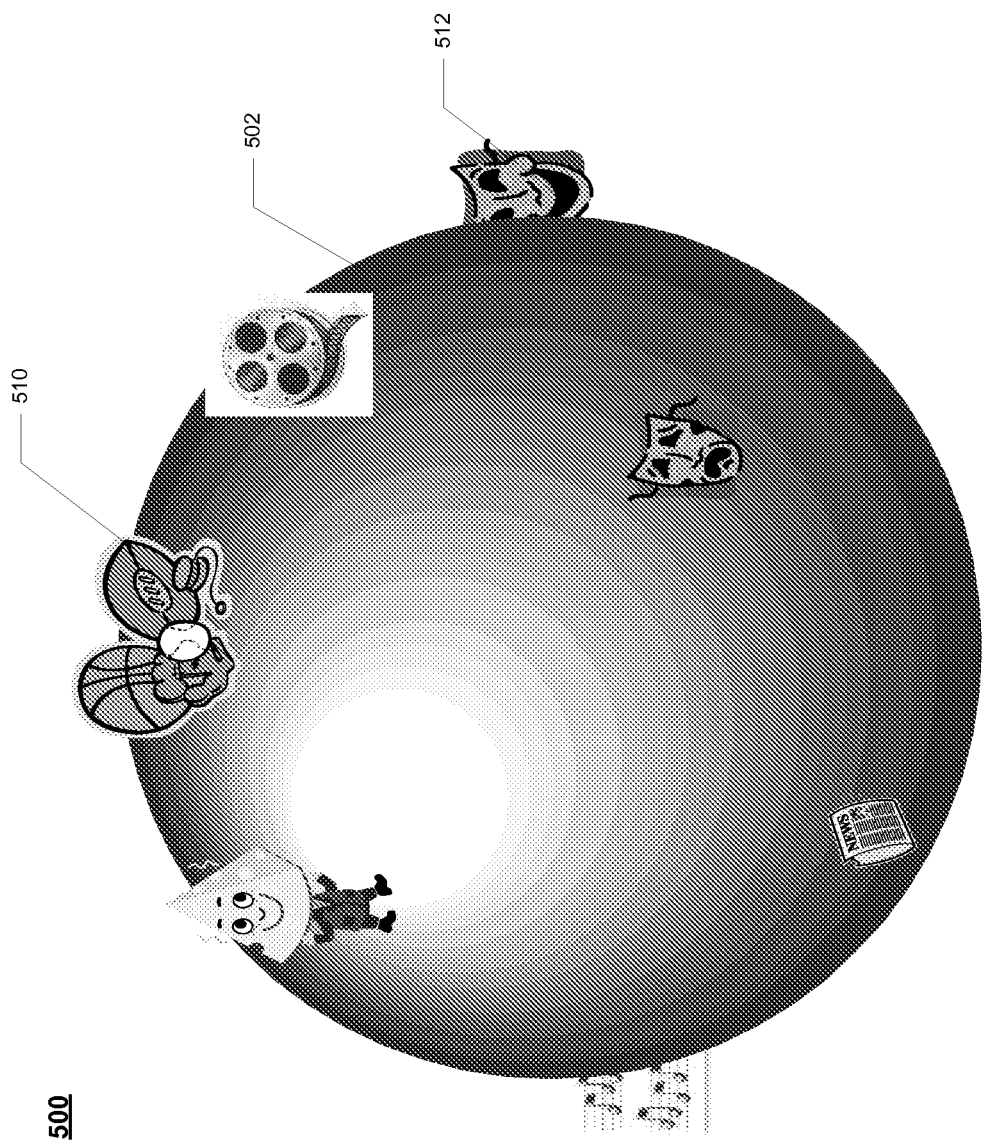
FIG. 5 is a diagram illustrating an alternative display format for available multimedia content items in accordance with one embodiment of the present disclosure.

The user can also manipulate the remote control 116 to select one of the icons 320-334 in similar fashion to that described above with respect to FIG. 2. In response, the processor 101 causes a set of multimedia content item options to be displayed, with the set of options displayed in an approximately circular arrangement. FIG. 4 shows an example of such an arrangement as display 400, including a number of multimedia content item options, such as option 435 and 436. Each option of display 400 is associated with the multimedia content sub-type selected by the user. In the illustrated example of FIG. 4, it is assumed that the user has selected icon 334 (FIG. 3) in order to view multimedia content item options associated with baseball. In response, the processor 101 provides, based on the multimedia content type information 121 (FIG. 1), a set of baseball games available for viewing. Each available game is rendered as a multimedia content item option.

The user can manipulate the remote control 116 to select one of the multimedia content item options in similar fashion to that described above with respect to FIG. 2. In response, the processor 101 can cause the multimedia content item associated with the selected option to be displayed, recorded, scheduled for display or recording, or the like, or any combination thereof. For example, if the user selects option 435, the processor 101 can cause the baseball game identified as "Detroit vs. Chicago" to be displayed at the display device 112, recorded at the client device 102, or the like. It will be appreciated that the options displayed at the FIG. 4 can be associated with more than one type and sub-type. For example, option 345 can be associated with a sports type and a baseball sub-type, and can also be associated with a local interest type and a Detroit sub-type. Thus, the user can reach a particular content option through more than one set of displayed icons.

Display 400 also includes a visual representation 450 of the display 300 (FIG. 3). The representation 450 provides a visual reminder of the type and sub-type of multimedia content associated with the content item options displayed at display 400. In similar fashion to that described above with respect to FIGS. 2 and 3, the user can manipulate the remote control 116 in order to return to display 300 and select another multimedia content sub-type for display of associated content item options.

Thus, the illustrated displays of FIGS. 2-4 provide for an interface by which the user can select available content items for viewing, recording, or the like. The user can manipulate the remote control 116, or an interface at the display device 112 (e.g. a touch-screen interface) to traverse the displays and select available content items. By displaying content types, sub-types, and content item options as icons displayed in an approximately circular arrangement, the multimedia display system 100 allows the user to quickly, conveniently, and enjoyably locate desired multimedia content items.

Figure 6:
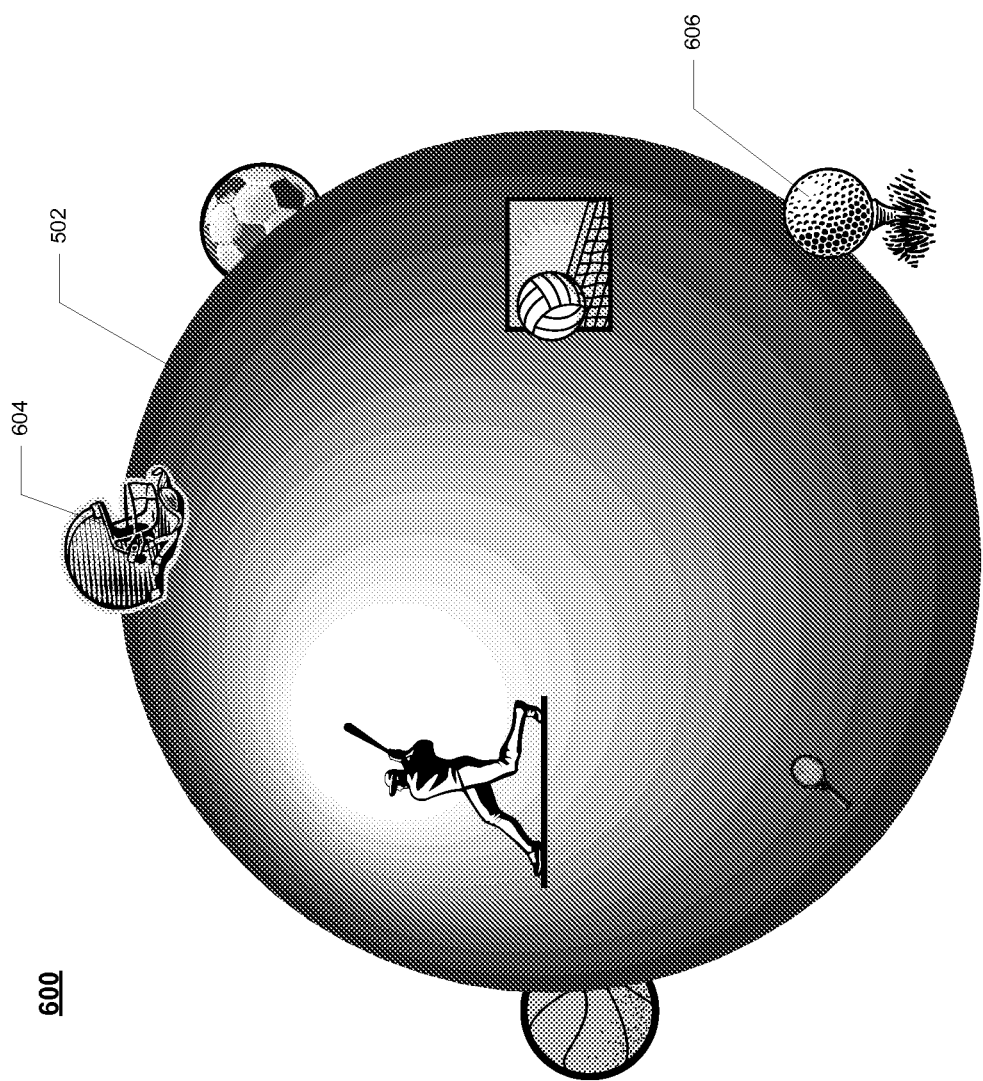
FIG. 6 is a diagram illustrating another display format for available multimedia content items in accordance with one embodiment of the present disclosure.

FIG. 6 illustrates a display 500 illustrating an alternative display format for a set of icons, where each icon is associated with a designated multimedia content type. In particular, the displayed icons, such as icons 510 and 512, correspond to similar icons illustrated in FIG. 2. However, in the illustrated embodiment of FIG. 6, the icons are distributed around a displayed sphere 502. Thus, in response to receiving a request to display a program guide, the data processor 101 causes the sphere 502 to be displayed, and further causes the icons to be arranged along points of the sphere. The user can manipulate the sphere 502 via the remote control 116 or other interface in order to select a particular icon. In particular, the user can rotate the sphere 502 in order to bring a particular icon into focus and then select the focused icon.

Each icon provides a visual representation of a particular type of multimedia content. In addition, the size or other visual characteristic (e.g. color, luminosity, animation, or the like) can provide an indication of the popularity of a content type, the number of available items associated with a content type, or the like, in similar fashion to that described above with respect to FIG. 2.

In response to selection of a particular icon, the data processor 102 can cause a new set of icons to be displayed in arrangement over the sphere 502, as illustrated by display 600 of FIG. 6. The set of icons, such as icons 604 and 606, are each associated with a particular sub-type of the selected multimedia content type, and correspond to the icons illustrated at FIG. 3. The user can manipulate the sphere 502 to select a particular icon in order to initiate display of a set of available multimedia content options, in similar fashion to that described above with respect to FIG. 4. However, the set of available options can be distributed over sphere 502 for display. The user can thus manipulate the remote control 116, or an interface at the display device 112 (e.g. a touch-screen interface), to traverse the displays 500 and 600 and select available content items. By displaying content types, sub-types, and content item options as icons displayed along points associated with the sphere 502, the multimedia display system 100 allows the user to quickly, conveniently, and enjoyably locate desired multimedia content items.

It will be appreciated that other information and icons can be presented via the displays illustrated in FIGS. 2-6. For example, an icon that is associated with dynamically generated multimedia content types. Thus, the client device 102 can determine, based on multimedia selections made by the user, if there are other content items that the user may be interested in. The client device 102 can create a multimedia type or sub-type (e.g. a "You May Also Be Interested In" type) based on these determinations, and display an icon associated with the created type or sub-type in one or more of the displays illustrated in FIGS. 2-6. This allows the user to locate and access multimedia content based on recommendations determined by the client device 102.

In addition, the displays illustrated in FIG. 2-6 can be based on the format, availability, and accessibility of multimedia content. Thus, the icons illustrated at FIG. 2 can be with a specific multimedia format, such as video or audio. The icons, and associated content options, can also be limited based on the accessibility of multimedia content. For example, the multimedia content associated with the displayed icons can be limited to on-demand content, or to live content, or to future content not currently available for viewing but available to schedule for recording. The multimedia content associated with each icon can also be limited to a programmable time menu.

Further, the characteristics of the multimedia content associated with each displayed icon can be programmed by the user. Thus, by manipulation of the remote control 116 or other interface, the user can request highly personalized sets of multimedia content. For example, the user can request that the multimedia content associated with the set of displayed icons at FIG. 2 be limited to on-demand high definition video content available in a specified three day period. This further provides the user the ability to quickly and conveniently navigate through a large set of available multimedia content.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
    receiving, by a system comprising a processor, a first request to display available multimedia content items;
    in response to receiving the first request:
        determining, by the system, a multimedia content type of each of the available multimedia content items based on metadata associated with the available multimedia content items;
        determining, by the system, a first plurality of representations by determining a representation of each multimedia content type of the available multimedia content items;
        determining, by the system, a size for each representation of the first plurality of representations, wherein each size of a respective representation is proportional to an amount of multimedia content associated with the respective representation;
        communicating, by the system, the first plurality of representations for display at a display device, wherein each representation of the first plurality of representations is indicative of a different multimedia content type;
        displaying, by the system, a sphere on the display device, wherein the first plurality of representations are distributed around the sphere and wherein a first representation of the first plurality of representations is selected as a focused icon;
        receiving, by the system, a second request to select a second representation of the first plurality of representations as the focused icon;
        rotating, by the system, the sphere on the display device to select the second representation as the focused icon according to the second request;
        generating, by the system, a first animation on the display device wherein the sphere is caused to shrink from a first size to a second size responsive to selection of the second representation;
        generating, by the system, a second animation on the display device wherein the sphere is caused to grow from the second size to the first size responsive to a third request;
        receiving, by the system, first input information indicative of a selection of one of the first plurality of representations; and
        in response to receiving the first input information, communicating, by the system, a second plurality of representations for display in a second circular arrangement at the display device, wherein each of the second plurality of representations is associated with a different sub-type of multimedia content subject matter that is associated with the selected one of the first plurality of representations.

2. The method of claim 1, further comprising
    determining, by the system, a first set of icons, wherein each icon is associated with one multimedia content type.

3. The method of claim 2, wherein each of the first set of icons is indicative of each of the different multimedia content types.

4. The method of claim 1, further comprising determining, by the system, the multimedia content type based on the metadata associated with the available multimedia content items represented by the first plurality of representations.

5. The method of claim 1, wherein the available multimedia content items are selected from the group consisting of video content, audio content, image content, and web content.

6. The method of claim 1, wherein each of the second plurality of representations is associated with a different multimedia content item of different subject matter that is associated with the selected one of the first plurality of representations.

7. The method of claim 1, further comprising:
    receiving second input information indicative of a selection of one of the second plurality of representations; and
    in response to receiving the second input information, communicating information to display a multimedia content item of the available multimedia content items that is associated with the selected one of the second plurality of representations.

8. The method of claim 1, further comprising:
    receiving input information indicative of a selection of one of the first plurality of representations; and
    in response to receiving the input information, communicating information to record a multimedia content item of the available multimedia content items that is associated with the selected one of the first plurality of representations.

9. A method, comprising:
    receiving, by a system comprising a processor, a first request to display a set of available multimedia content items; and
    in response to receiving the request:
        determining, by the system, a multimedia content type of each of the available multimedia content items based on metadata extracted from the available multimedia content items;
        communicating, by the system, a first set of icons for display at a display device, wherein each icon of the first set of icons is indicative of a different multimedia content type;
        determining, by the system, a size for each icon of the first set of icons, wherein each size of a respective icon is proportional to an amount of multimedia content associated with the respective icon;
        displaying, by the system, a sphere on the display device, wherein the first set of icons are distributed around the sphere and wherein a first representation of the first set of icons is selected as a focused icon;
        receiving, by the system, a second request to select a second representation of the first set of icons as the focused icon;
        rotating, by the system, the sphere on the display device to select the second representation as the focused icon according to the second request;
        generating, by the system, a first animation on the display device wherein the sphere is caused to shrink from a first size to a second size responsive to selection of the second representation; and generating, by the system, a second animation on the display device wherein the sphere is caused to grow from the second size to the first size responsive to a third request;

receiving, by the system, first input information indicative of a selection of one of the first set of icons; and in response to receiving the first input information, displaying, by the system, a second set of icons on the display in a second circular arrangement around the sphere, wherein each of the second set of icons is associated with a different sub-type of multimedia content subject matter that is associated with the selected one of the first set of icons.

10. The method of claim 9, wherein the first set of icons comprises a first icon associated with a first type of available multimedia content item, and wherein a displayed size of the first icon is based on an amount of multimedia content items available for the first type.

11. The method of claim 9, further comprising changing, by the system, a displayed size of the second representation according to the request.

12. The method of claim 9, further comprising changing, by the system, a visual characteristic of the second representation according to the request.

13. A device, comprising:
a memory, the memory embodied in a computing device to store instructions; and
a processor coupled to the memory, wherein the processor, responsive to executing the instructions, performs operations comprising;
determining in response to receiving a first request, a multimedia content type of each item in a set of available multimedia content items based on metadata associated with the available multimedia content items and to communicate a first set of icons for display at a display device, wherein each icon of the first set of icons is indicative of a different multimedia content type;
determining a size for each icon of the first set of icons, wherein each size of a respective icon is proportional to an amount of multimedia content associated with the respective icon;
displaying a sphere on the display device, wherein the first set of icons are distributed around the sphere and wherein a first representation of the first set of icons is selected as a focused icon;
receiving a second request to select a second representation of the first set of icons as the focused icon;
rotating the sphere on the display device to select the second representation as the focused icon according to the second request;
generating a first animation on the display device wherein the sphere is caused to shrink from a first size to a second size responsive to selection of the second representation; and
generating a second animation on the display device wherein the sphere is caused to grow from the second size to the first size responsive to a third request;
receiving first input information indicative of a selection of one of the first set of icons; and
in response to receiving the first input information, communicating a second set of icons for display in a second circular arrangement at the display device, wherein each of the second set of icons is associated with a different sub-type of multimedia content subject matter that is associated with the selected one of the first set of icons.

14. The device of claim 13, wherein the first set of icons comprises a first icon associated with a first type of available multimedia content item, and wherein a displayed size of the first icon is based on an amount of multimedia content items available for the first type.

15. The device of claim 14, wherein the first set of icons further comprises a second icon associated with a second type of available multimedia content item, and wherein a displayed size of the second icon is based on a popularity of the second type of multimedia content items.

16. The device of claim 13, wherein the processor further performs operations comprising displaying the second set of icons around the sphere.

17. The device of claim 13, wherein the processor further performs operations comprising communicating, in response to receiving the request, information to highlight the display of one of the first set of icons.

18. A method, comprising:
receiving, by a system comprising a processor, a first request to display a set of available multimedia content items; and
in response to receiving the first request:
determining, by the system, a multimedia content type of each item in the set of the available multimedia content items by determining the multimedia content type based on metadata extracted from the available multimedia content items;
communicating, by the system, information to display a sphere at a display device; and
communicating, by the system, a first set of icons for display in an arrangement over the sphere;
determining, by the system, a size for each icon of the first set of icons, wherein each size of a respective icon is proportional to an amount of multimedia content associated with the respective icon;
displaying, by the system, the sphere on the display device, wherein the first set of icons are distributed around the sphere, wherein a displayed size of one icon of the first set of icons is indicative of a number of multimedia content items available for the one icon, and wherein a first representation of the first set of icons is selected as a focused icon;
receiving, by the system, a second request to select a second representation of the first set of icons as the focused icon;
rotating, by the system, the sphere on the display device to select the second representation as the focused icon according to the request;
generating, by the system, a first animation on the display device wherein the sphere is caused to shrink from a first size to a second size responsive to selection of the second representation;
generating, by the system, a second animation on the display device wherein the sphere is caused to grow from the second size to the first size responsive to a third request;
receiving, by the system, first input information indicative of a selection of one of the first set of icons; and
in response to receiving the first input information, communicating, by the system, a second set of icons for display in a second circular arrangement around the sphere at the display device, wherein each of the second set of icons is associated with a different sub-type of multimedia content subject matter that is associated with the selected one of the first set of icons.

* * * * *